(12) United States Patent
Whitesides et al.

(10) Patent No.: US 7,230,751 B2
(45) Date of Patent: Jun. 12, 2007

(54) ELECTROPHORETIC DISPLAYS USING GASEOUS FLUIDS

(75) Inventors: Thomas H. Whitesides, Somerville, MA (US); Guy M. Danner, Somerville, MA (US); Karl R. Amundson, Cambridge, MA (US); Charles Howie Honeyman, Roslindale, MA (US); Russell J. Wilcox, Natick, MA (US); Michael D. McCreary, Acton, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 11/307,177

(22) Filed: Jan. 26, 2006

(65) Prior Publication Data

US 2006/0209388 A1   Sep. 21, 2006

Related U.S. Application Data

(60) Provisional application No. 60/593,674, filed on Feb. 4, 2005, provisional application No. 60/593,570, filed on Jan. 26, 2005.

(51) Int. Cl.
*G02B 26/00* (2006.01)
*G09G 3/34* (2006.01)

(52) U.S. Cl. ........................................ 359/296; 345/107
(58) Field of Classification Search ................ 345/107; 359/296
See application file for complete search history.

(56) References Cited

U.S. PATENT DOCUMENTS

| | | | |
|---|---|---|---|
| 3,590,000 A | 6/1971 | Palermiti et al. |
| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,418,346 A | 11/1983 | Batchelder |
| 5,745,094 A | 4/1998 | Gordon, II et al. |
| 5,760,761 A | 6/1998 | Sheridon |
| 5,777,782 A | 7/1998 | Sheridon |
| 5,808,783 A | 9/1998 | Crowley |

(Continued)

FOREIGN PATENT DOCUMENTS

EP   1 099 207 B1   3/2002

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner*—David N. Spector
(74) *Attorney, Agent, or Firm*—David J. Cole (57) ABSTRACT

Various improvements are provided in gas-based electrophoretic displays, including (a) the use of water getters to remove water from the gas; (b) the use of electron accepting or donating gases; (c) the use of electrophoretic polymer particles having high glass transition temperatures; (d) lateral movement of electrophoretic particles within the display; and (e) the use of variable thickness coatings on electrodes to provide for gray scale.

64 Claims, 1 Drawing Sheet

U.S. PATENT DOCUMENTS

| | | |
|---|---|---|
| 5,872,552 A | 2/1999 | Gordon, II et al. |
| 5,930,026 A | 7/1999 | Jacobson et al. |
| 5,935,750 A | 8/1999 | Barbetta et al. |
| 5,961,804 A | 10/1999 | Jacobson et al. |
| 6,017,584 A | 1/2000 | Albert et al. |
| 6,051,353 A | 4/2000 | Hoffend et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,636,186 B1 * | 10/2003 | Yamaguchi et al. ........ 345/31 |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et a. |
| 6,865,010 B2 | 3/2005 | Duthaler et al. |
| 6,866,760 B2 | 3/2005 | Paolini Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 2002/0060321 A1 | 5/2002 | Kazlas et al. |
| 2002/0090980 A1 | 7/2002 | Wilcox et al. |
| 2002/0113770 A1 | 8/2002 | Jacobson et al. |
| 2002/0180687 A1 | 12/2002 | Webber |
| 2003/0011560 A1 | 1/2003 | Albert et al. |
| 2003/0102858 A1 | 6/2003 | Jacobson et al. |
| 2003/0151702 A1 | 8/2003 | Morrison et al. |
| 2003/0222315 A1 | 12/2003 | Amundson et al. |
| 2004/0014265 A1 | 1/2004 | Kazlas et al. |
| 2004/0075634 A1 | 4/2004 | Gates |
| 2004/0094422 A1 | 5/2004 | Pullen et al. |
| 2004/0105036 A1 | 6/2004 | Danner et al. |
| 2004/0112750 A1 * | 6/2004 | Jacobson et al. ........ 204/601 |
| 2004/0119681 A1 | 6/2004 | Albert et al. |
| 2004/0136048 A1 | 7/2004 | Arango et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0196215 A1 | 10/2004 | Duthaler et al. |
| 2004/0226820 A1 | 11/2004 | Webber et al. |

| | | | |
|---|---|---|---|
| 2004/0239614 A1 | 12/2004 | Amundson et al. | |
| 2004/0252360 A1 | 12/2004 | Webber et al. | |
| 2004/0257635 A1 | 12/2004 | Paolini, Jr. et al. | |
| 2004/0263947 A1 | 12/2004 | Drzaic et al. | |
| 2005/0001810 A1 | 1/2005 | Yakushiji et al. | |
| 2005/0001812 A1 | 1/2005 | Amundson et al. | |
| 2005/0007336 A1 | 1/2005 | Albert et al. | |
| 2005/0012980 A1 | 1/2005 | Wilcox et al. | |
| 2005/0017944 A1 | 1/2005 | Albert | |
| 2005/0018273 A1 | 1/2005 | Honeyman et al. | |
| 2005/0024353 A1 | 2/2005 | Amundson et al. | |
| 2005/0062714 A1 | 3/2005 | Zehner et al. | |
| 2005/0067656 A1 | 3/2005 | Denis et al. | |
| 2005/0078099 A1 | 4/2005 | Amundson et al. | |
| 2005/0099672 A1 | 5/2005 | Jacobson et al. | |
| 2005/0122284 A1 | 6/2005 | Gates et al. | |
| 2005/0122306 A1 | 6/2005 | Wilcox et al. | |
| 2005/0122563 A1 | 6/2005 | Honeyman et al. | |
| 2005/0122564 A1 | 6/2005 | Zehner et al. | |
| 2005/0122565 A1 | 6/2005 | Doshi et al. | |
| 2005/0134554 A1 | 6/2005 | Albert et al. | |
| 2005/0146774 A1 | 7/2005 | LeCain et al. | |
| 2005/0151709 A1 | 7/2005 | Jacobson et al. | |
| 2005/0152018 A1 | 7/2005 | Abramson et al. | |
| 2005/0152022 A1 | 7/2005 | Honeyman et al. | |
| 2005/0156340 A1 | 7/2005 | Valianatos et al. | |
| 2005/0168799 A1 | 8/2005 | Whitesides et al. | |
| 2005/0179642 A1 | 8/2005 | Wilcox et al. | |
| 2005/0190137 A1 | 9/2005 | Duthaler et al. | |
| 2005/0212747 A1 | 9/2005 | Amundson | |
| 2005/0212748 A1 | 9/2005 | Matsuura et al. | |
| 2005/0213191 A1 | 9/2005 | Whitesides et al. | |
| 2005/0219184 A1 | 10/2005 | Zehner et al. | |
| 2005/0253777 A1 | 11/2005 | Zehner et al. | |
| 2005/0270261 A1 | 12/2005 | Danner et al. | |
| 2005/0280626 A1 | 12/2005 | Amundson et al. | |
| 2006/0007527 A1 | 1/2006 | Paolini, Jr. et al. | |
| 2006/0024437 A1 | 2/2006 | Pullen et al. | |
| 2006/0038772 A1* | 2/2006 | Amundson et al. | 345/107 |
| 2006/0087479 A1 | 4/2006 | Sakurai et al. | |
| 2006/0139308 A1 | 6/2006 | Jacobson et al. | |
| 2006/0181504 A1 | 8/2006 | Kawai | |
| 2006/0197736 A1 | 9/2006 | Baucom et al. | |
| 2006/0197737 A1 | 9/2006 | Baucom et al. | |
| 2006/0202949 A1* | 9/2006 | Danner et al. | 345/107 |
| 2006/0291034 A1* | 12/2006 | Patry et al. | 359/296 |

FOREIGN PATENT DOCUMENTS

| | | |
|---|---|---|
| EP | 1 145 072 B1 | 5/2003 |
| EP | 1 462 847 | 9/2004 |
| EP | 1 482 354 | 12/2004 |
| EP | 1 484 635 | 12/2004 |
| EP | 1 500 971 A1 | 1/2005 |
| EP | 1 501 194 A1 | 1/2005 |
| EP | 1 536 271 | 6/2005 |
| EP | 1 542 067 | 6/2005 |
| EP | 1 577 702 | 9/2005 |
| EP | 1 577 703 | 9/2005 |
| EP | 1 598 694 | 11/2005 |
| JP | 2003-241233 | 8/2003 |
| JP | 2004-004405 | 1/2004 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |
| WO | WO 2004/090626 | 10/2004 |
| WO | WO 2005/034074 | 4/2005 |
| WO | WO 2005/052905 | 6/2005 |
| WO | WO 2005/094519 | 10/2005 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Donnet et al., "Carbon Black" (2d Edn.), Marcel Dekker, New York NY (1993), pp. 395-401.

Drzaic, P., et al., "A Printed and Rollable Bistable Electronic Display", SID 98 Digest (1998), p. 1131.

Duthaler, G. et al., "Active-Matrix Color Displays Using Electrophoretic Ink and Colors Filters", SID 02 Digest, 1374 (2002).

Gates, H. et al., "A5 Sized Electronic Paper Display for Document Viewing", SID 05 Digest, (2005).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

ELECTROPHORETIC DISPLAYS USING GASEOUS FLUIDS

REFERENCE TO RELATED APPLICATION

This application claims benefit of Provisional Application Ser. No. 60/593,570, filed Jan. 26, 2005, and Provisional Application Ser. No. 60/593,674, file Feb. 4, 2005. The entire contents of these copending applications, and of all other U.S. patents and published and copending applications mentioned below, are herein incorporated by reference.

BACKGROUND OF INVENTION

This invention relates to electrophoretic displays using gaseous fluids.

Particle-based electrophoretic displays, in which a plurality of charged particles move through a fluid under the influence of an electric field so as to change at least one optical property or optical characteristic of the display, have been the subject of intense research and development for a number of years. Such displays can have attributes of good brightness and contrast, wide viewing angles, state bistability, and low power consumption when compared with liquid crystal displays. Although the optical characteristic which changes is typically color perceptible to the human eye, it may be any other optical characteristic, such as optical transmission, reflectance, luminescence or, in the case of displays intended for machine reading, pseudo-color in the sense of a change in reflectance of electromagnetic wavelengths outside the visible range.

(The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.)

Nevertheless, problems with the long-term image quality of electrophoretic displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; and 6,987,603; and U.S. Patent Applications Publication Nos. 2002/0060321; 2002/0063661; 2002/0090980; 2002/0113770; 2002/0130832; 2002/0180687; 2003/0011560; 2003/0025855; 2003/0102858; 2003/0132908; 2003/0137521; 2003/0222315; 2004/0014265; 2004/0075634; 2004/0094422; 2004/0105036; 2004/0112750; 2004/0119681; 2004/0136048; 2004/0155857; 2004/0180476; 2004/0190114; 2004/0196215; 2004/0226820; 2004/0239614; 2004/0252360; 2004/0263947; 2005/0000813; 2005/0001812; 2005/0007336; 2005/0007653; 2005/0012980; 2005/0017944; 2005/0018273; 2005/0024353; 2005/0035941; 2005/0041004; 2005/0062714; 2005/0067656; 2005/0078099; 2005/0099672; 2005/0105159; 2005/0105162; 2005/0122284; 2005/0122306; 2005/0122563; 2005/0122564; 2005/0122565; 2005/0134554; 2005/0146774; 2005/0151709; 2005/0152018; 2005/0152022; 2005/0156340; 2005/0168799; 2005/0168801; 2005/0179642; 2005/0190137; 2005/0212747; 2005/0213191; 2005/0219184; and 2005/0253777; and International Applications Publication Nos. WO 99/67678; WO 00/05704; WO 00/38000; WO 00/36560; WO 00/67110; WO 00/67327; WO 01/07961; and WO 03/107,315.

Some of the aforementioned patents and published applications disclose encapsulated electrophoretic media having three or more different types of particles within each capsule. For purposes of the present application, such multi-particle media are regarded as sub-species of dual particle media.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques.) Thus, the resulting display can be flexible. Further, because the display medium can be printed (using a variety of methods), the display itself can be made inexpensively.

As noted above, electrophoretic media require the presence of a suspending fluid. In most prior art electrophoretic media, this suspending fluid is a liquid, but electrophoretic media can be produced using gaseous "suspending" fluids (although the term "suspending fluid" is a misnomer when the fluid is a gas since the electrophoretic particles are not actually suspended by the fluid, and hence the term "suspending" is generally avoided below when the fluid is gaseous); see, for example, Kitamura, T., et al., "Electrical toner movement for electronic paper-like display", Asia Display/IDW '01 (Proceedings of the 21st International Display Research Conference in conjunction with The 8th International Display Workshops, Oct. 16–19, 2001, Nagoya, Japan), page 1517, Paper HCS1-1, and Yamaguchi, Y., et al., "Toner display using insulative particles charged triboelectrically", Asia Display/IDW '01, page 1729, Paper AMD4-4. See also European Patent Applications 1,429,178; 1,462,847; and 1,482,354; and International Applications WO 2004/090626; WO 2004/079442; WO 2004/077140; WO 2004/059379; WO 2004/055586; WO 2004/008239; WO 2004/006006; WO 2004/001498; WO 03/091799; and WO 03/088495. Such gas-based ("GB") electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous fluids as compared with liquid ones allows more rapid settling of the electrophoretic particles.

The use of gaseous fluids instead of liquids in electrophoretic media does provide certain advantages. For example, since the rate at which an electrophoretic can switch between its extreme optical states is a function of the viscosity of the fluid, the use of a lower viscosity gas in place of a liquid may provide a substantial increase in switching speed, thus potentially enabling displays capable of displaying video. However, the use of gaseous fluids is attended by a number of problems, and the present invention seeks to overcome or alleviate these problems.

SUMMARY OF THE INVENTION

In one aspect this invention provides an electrophoretic display comprising a pair of facing substrates at least one of which is transparent, a plurality of at least one type of particle and a gas enclosed between the substrates, means for applying an electric field across the substrates so as to cause the particles to move between the substrates, and vibration inducing means for causing mechanical vibration and tribocharging of the at least one type of particle. This type of display may hereinafter be called a "vibrated display" of the present invention.

In such a vibrated display, the vibration inducing means may comprise a piezoelectric device, which may be provided in sheet form. Alternatively, the vibration inducing device may comprise a generator for sonic or ultrasonic waves, for example sonic or ultrasonic waves having a frequency in the range of about 500 Hz to about 600 kHz. In another form of vibrated display, the vibration inducing means may comprise wall defining cavities, a liquid present in the cavities in mechanical communication with the gas, and means for causing vibration of the liquid and thereby inducing vibration of the gas.

In a vibrated display of the invention, the vibration inducing means may be arranged to vary the frequency of the mechanical vibrations of the particles. The vibration inducing means may be arranged to apply mechanical vibration to the particles prior to each rewriting of the display, or to apply mechanical vibration to the particles prior to each rewriting of the display which occurs more than a predetermined period of time after the last application of mechanical vibration. The vibration inducing means may comprise at least one micro-mechanical device. The vibrated display may be of the microcell type, with the gas and the particles confined within a plurality of cavities formed in a carrier medium.

In another aspect, this invention provides an electrophoretic display comprising a pair of facing substrates at least one of which is transparent, a plurality of at least one type of particle and a gas enclosed between the substrates, and means for applying an electric field across the substrates so as to cause the particles to move between the substrates, the display having at least one wall in contact with the gas and having a volume resistivity in the range of about $10^7$ to about $10^{11}$ ohm cm. This type of display may hereinafter be called a "controlled resistivity wall display" of the present invention.

In such a controlled resistivity wall display, the wall may have a volume resistivity in the range of about $10^7$ to about $10^9$ ohm cm. The display may be of the microcell type, with the gas and the particles confined within a plurality of cavities formed in a carrier medium, the cavities being separated from one another by walls having a volume resistivity in the range of about $10^7$ to about $10^{11}$ ohm cm.

In another aspect, this invention provides a method of charging particles in an electrophoretic display, the display comprising a pair of facing substrates at least one of which is transparent, a plurality of a first type of particle capable of being triboelectrically charged, a plurality of a second type of particle having a polarizability greater than that of the first type of particle, and a gas, the first and second types of particles and the gas being enclosed between the substrates, the method comprising applying a non-uniform electric field between the substrates, thereby causing dielectrophoretic movement of the second type of particles and consequent triboelectric charging of the first type of particles. This method may hereinafter be called the "dielectrophoretic tribocharging method" of the present invention.

In such a dielectrophoretic tribocharging method, the second type of particle may comprise an electrically conductive core (formed of, for example, a metal) surrounded by a substantially non-conductive shell. The shell may comprise a material selected from organic polymers and copolymers, inorganic ceramic materials, and insulating organic/inorganic composite materials. The organic polymer or copolymer may be selected from fluoropolymers, polyacrylates, polyesters, polyamides and polyvinyl compounds. The shell may further comprise a charge control agent, for example an ammonium, sulfonium or phosphonium salt.

Alternatively, the second type of particle may comprise a semi-conductive metal oxide, for example indium oxide or indium tin oxide.

In another aspect, this invention provides an electrophoretic display comprising a pair of facing substrates at least one of which is transparent, a plurality of a first type of particle (electrophoretic particle) and a gas enclosed between the substrates, and means for applying an electric field across the substrates so as to cause the first type of particles to move between the substrates, the display further comprising a plurality of a second type of particle (carrier particle) effective to increase triboelectric charging of the first type of particles. For reasons explained below, this type of display may hereinafter be called a "carrier particles display" of the present invention.

Such a carrier particles display may further comprise a plurality of a third type of particle (in effect, a second type of electrophoretic particle), the third type of particle developing a charge, upon triboelectric charging, of opposite polarity to that on the first type of particle, the third type of particle also having at least one optical characteristic different from that of the first type of particle. In such a carrier particles display, it will typically be advantageous for the carrier particles to be smaller than the electrophoretic particles. The carrier particle may comprise a metal or a ceramic, optionally coated with a polymer.

In another aspect, this invention provides an electrophoretic display comprising a pair of facing substrates at least one of which is transparent, a plurality of particles and a gas enclosed between the substrates, and means for applying an electric field across the substrates so as to cause the particles to move between the substrates, wherein the particles comprise titania coated with silica and/or alumina. For obvious reasons, this type of display may hereinafter be called a "coated titania display" of the present invention.

In another aspect, this invention provides an electrophoretic display comprising a pair of facing substrates at least one of which is transparent, a plurality of particles and a gas enclosed between the substrates, and means for applying an electric field across the substrates so as to cause the particles to move between the substrates, wherein the particles comprise carbon black having a polymeric coating. For obvious reasons, this type of display may hereinafter be called a "coated carbon black display" of the present invention. Coated titania particles and coated carbon black particles may advantageously be used in the same display.

In another aspect, this invention provides an electrophoretic display comprising a pair of facing substrates at least one of which is transparent, a plurality of particles and a gas enclosed between the substrates, and means for applying an electric field across the substrates so as to cause the particles to move between the substrates, wherein the transparent substrate is provided with a coating for reducing the transmission of ultraviolet radiation through the transparent substrate. This type of display may hereinafter be called a "UV coated display" of the present invention. The coating may comprise, for example, a polymeric film or a sputtered coating.

In another, related aspect, this invention provides an electrophoretic display comprising a pair of facing substrates at least one of which is transparent, a plurality of particles and a gas enclosed between the substrates, and means for applying an electric field across the substrates so as to cause the particles to move between the substrates, wherein at least some of the particles are arranged to absorb ultraviolet radiation. This type of display may hereinafter be called a "UV absorbing particles display" of the present invention.

In such a UV absorbing particles display, the particles arranged to absorb ultraviolet radiation may comprise carbon black. In addition to the carbon black, the plurality of particles may comprise titania particles.

In another aspect, this invention provides an electrophoretic display comprising a pair of facing substrates at least one of which is transparent, a plurality of particles and a gas enclosed between the substrates, and means for applying an electric field across the substrates so as to cause the particles to move between the substrates, the display further comprising a water-absorbing compound in contact with the gas. For obvious reasons, this type of display may hereinafter be called a "water getter display" of the present invention.

In such a water getter display, the water-absorbing compound may comprise one or more of an alkaline earth metal and an oxide, carbonate or sulfate of an alkaline earth metal. For example, the water-absorbing compound may be one or more of calcium carbonate, magnesium sulfate, sodium sulfate, calcium oxide and alumina. Since the presence of a loose, particulate water-absorbing compound may be inconvenient in a gas-based display (for example, the water-absorbing compound might become entrained by the electrophoretic particles and adversely affect the optical state of the display), the water-absorbing may be incorporated into a wall in contact with the gas. Specifically, when the display comprises a plurality of cell walls extending between the two substrates and defining a plurality of cavities within which the gas and the particles are confined, the water-absorbing compound may be incorporated into some or all of the cell walls.

In another aspect, this invention provides an electrophoretic display comprising a pair of facing substrates at least one of which is transparent, a plurality of particles and a gas enclosed between the substrates, and means for applying an electric field across the substrates so as to cause the particles to move between the substrates, wherein the gas is able to accept electrons from, or donate electrons to, the particles. This type of display may hereinafter be called an "electron accepting/donating gas display" or "EADG display". In such a display, the gas may comprise an alkali metal (for example, sodium), mercury or a halogen (for example, chlorine).

In another aspect, this invention provides an electrophoretic display comprising a pair of facing substrates at least one of which is transparent and forms a viewing surface, cell walls defining a plurality of cavities between the substrates, a plurality of particles and a gas enclosed within the cavities, and means for applying an electric field across the substrates so as to cause the particles to move between the substrates, the means for applying an electric field being arranged to drive the particles to a first optical state, in which at least some of the particles lie adjacent the viewing surface so that the viewing surface displays a first optical characteristic, and to drive the particles to a second optical state, in which the particles are disposed adjacent the cell walls so that the light can pass through the cavities and the viewing surface displays a second optical characteristic different from the first optical characteristic. This type of display may hereinafter be called a "lateral movement display" of the present invention.

In such a lateral movement display, the means for applying electric field may be arranged to apply a non-uniform electric field so that the particles are moved by dielectrophoretic forces to the cell walls. Alternatively, the means for applying electric field may comprise electrodes disposed at or adjacent the cell walls for moving the particles adjacent the cell walls. A preferred form of such a lateral movement display includes two different types of electrophoretic particles, i.e., the particles include a plurality of a first type of particle capable of being charged with a charge of a first polarity and having the first optical characteristic, and a plurality of a second type of particle capable of being charged with a charge of a second polarity opposite to the first polarity, the second type of particle having a third optical characteristic different from the first and second optical characteristics. The two types of electrophoretic particles may be white and black, or one or both of the types of electrophoretic particles may have a color other than white or black. This display may comprise a colored filter or reflector disposed on the opposed side of the cavities from the viewing surface; in order to allow for a full color display, the colored filter or reflector desirably comprises areas having at least three different colors, for example, red green and blue or yellow, cyan and magenta.

In another aspect, this invention provides an electrophoretic display comprising a pair of facing substrates at least one of which is transparent, a plurality of particles and a gas enclosed between the substrates, and means for applying an electric field across the substrates so as to cause the particles to move between the substrates, the particles comprising a plurality of a first type of particle capable of being charged with a charge of a first polarity, and a plurality of a second type of particle capable of being charged with a charge of a second polarity opposite to the first polarity, the charge on the second type of particle being smaller in magnitude than the charge on the first type of particle, the first and second types of particles having substantially the same optical characteristic. For reasons explained below, this type of display may hereinafter be called a "diluent particles display" of the present invention. In such a display, the second type of particle (diluent particle) will typically be smaller than the first type of particle (electrophoretic particle).

In another aspect, this invention provides an electrophoretic display comprising a pair of facing substrates at least one of which is transparent, a plurality of particles and a gas enclosed between the substrates, and means for applying an electric field across the substrates so as to cause the particles to move between the substrates, the display comprising a plurality of pixels and the means for applying an electric field comprising at least one electrode having a surface covered by an insulating coating, the thickness of the insulating coating varying within one pixel. This type of display may hereinafter be called a "variable thickness coated electrode display" of the present invention.

In such a variable thickness coated electrode display, the insulating coating may be patterned so that some parts of the electrode are free from the insulating coating. Alternatively, the whole of the area of the electrode corresponding to the one pixel may be covered by the insulating coating, but the thickness of the insulating coating may vary from point to point within the pixel.

In another aspect, this invention provides an electrophoretic display comprising a pair of facing substrates at least one of which is transparent, a plurality of particles and a gas enclosed between the substrates, and means for applying an electric field across the substrates so as to cause the particles to move between the substrates, the display comprising at least one electrode having a surface covered by an coating which is insulating at low electric fields but conductive at high electric fields. This type of display may hereinafter be called a "variable conductivity coated electrode display" of the present invention. The coating may comprise, for example, an insulating binder filled with non-spherical conductive particles.

In another aspect, this invention provides an electrophoretic display comprising a pair of facing substrates at least one of which is transparent, a plurality of particles and a gas enclosed between the substrates, and means for applying an electric field across the substrates so as to cause the particles to move between the substrates, wherein the particles comprise a polymer having a glass transition temperature of at least about 80° C. For obvious reasons, this type of display may hereinafter be called a "high $T_g$ polymer display" of the present invention.

In such a high $T_g$ polymer display, the polymer will typically have a glass transition temperature of at least about 100° C. The polymer may comprise any one or more of a fluoropolymer, polyacrylate, polyester, polyamide, and polyvinyl compound.

Finally, this invention provides an electrophoretic display comprising a pair of facing substrates at least one of which is transparent, a plurality of particles and a gas enclosed between the substrates, and means for applying an electric field across the substrates so as to cause the particles to move between the substrates, wherein the plurality of particles comprises particles having substantially the same optical characteristics but differing in size by a factor of at least about 2. This type of display may hereinafter be called a "varying size electrophoretic particles display" of the present invention.

In such a varying size electrophoretic particles display, the plurality of particles will typically comprise particles having substantially the same optical characteristics but differing in size by a factor of at least about 5. In a preferred form of such a varying particle size display, there are two different types of particles having different optical characteristics and each type is of varying size, i.e., the plurality of particles comprises a plurality of a first type of particle having a first optical characteristic and capable of being triboelectrically charged with a charge of a first polarity, and a plurality of a second type of particles having a second optical characteristic different from the first optical characteristic and capable of being triboelectrically charged with a charge of a second polarity opposite to that of the first polarity, wherein both the first and second types of particles comprise particles having substantially the same optical characteristics but differing in size by a factor of at least about 2.

DETAILED DESCRIPTION OF THE INVENTION

As will be apparent from the foregoing Summary of the invention Section, this invention provides numerous different improvements in gas-based electrophoretic displays. The various aspects of the invention will mainly be described separately below, but it should be recognized that a single gas-based electrophoretic display may make use of several different aspects of the invention. For example, the accompanying drawings are provided primarily to illustrate the operation of a lateral movement display of the present invention, but the illustrated display could also make use of coated titania particles, coated carbon black particles, walls with controlled resistivity or other aspects of the present invention.

Improvements Relating to Charging of Gas-Based Displays

The first major problem with GB electrophoretic displays relates to developing and maintaining charge on the electrophoretic particles. Obviously, the electrophoretic movement of particles for changing the optical state of an electrophoretic display requires that the electrophoretic particles be charged, and since the force imposed on an electrophoretic particle by a given electric field is proportional to the charge on the particle, the switching behavior is also affected by the magnitude of the charge on the particle; hence, to ensure reproducible switching behavior, it is normally desirable that the particles carry a charge within a predetermined range. In electrophoretic displays using liquid suspending fluids, the charges on the electrophoretic particles are essentially permanent, typically being controlled by change control agents present in the suspending fluid and adsorbed on the particles. Furthermore, with liquid suspending fluids, the charge on the particles is maintained by an electrochemical equilibrium between the particles themselves and charged species present in the liquid suspending fluid.

In contrast, in gas-based electrophoretic displays, it appears that the charge on the electrophoretic particles is inherently (thermodynamically) unstable and will dissipate over time. This instability in charge is a consequence of the absence of a medium with which the particles can be in electrochemical equilibrium. In the absence of a chemical potential difference between the particle surface and a medium of some sort there appears to be no mechanism to maintain a stable electrical potential (charge) on the particles. Thus, while particles in a gas-based display may possess a net electric charge, this charge may be unpredictable or vary greatly with time, and such unpredictable or unstable particle charges pose major challenges for driving such a display. The charge on the electrophoretic particles will typically be strongly dependent on the recent motion of the particles, in that the charges on the particles are generated or dissipated through collisions between particles and between particles and other objects such as walls. With an unknown charge, the effect of a driving voltage on the optical state of the display is unknown. For example, if the particle charge is very small, a particular voltage pulse, say, a 50 V pulse applied for 20 milliseconds, may have very little effect on the final optical state, whereas, if the particle charge is large, the same voltage pulse may have a large effect on the final optical state. Developing algorithms for displaying images on such a display is problematic under such circumstances.

Although much of the prior art relating to GB displays exhibits a curious reticence as to how the charges on the particles are developed and maintained, it appears that one mechanism by which particle charges are developed and maintained is tribo-electric (frictional) charging. Tribo-charging requires relative motion between adjacent particles to refresh charges thereon before the display can be switched. It is known that an alternating (AC) or "shake-up" pulse may be used to induce tribo-charging. However, providing such an AC pulse involves significant additional expense in increased complexity in the drivers and controllers used to operate the display, and also increases the power requirement of the display. Aspects of the present invention relate to alternative methods for effecting tribo-charging of particles in a GB display.

One approach to tribo-charging the electrophoretic particles is to physically shake the display, in accordance with the vibrated display aspect of the present invention. Mechanical shaking may occur through any suitable means. Electromechanical vibrators are known in the art operating by principle of magnetostriction (magnetic elongation), electromagnetism of the moving coil, variable reluctance, piezoelectric media, spinning asymmetric or eccentric weight, or other electromagnetic or electromechanical vibrator. Simple, inexpensive vibrating devices are employed in cellular telephones, stereo speakers, video game controllers and hearing aids in high volumes and could be used in portable devices. Incorporation of a piezoelectric device into the display may allow the driving voltage of the display to be reduced by preceding each driving pulse (or certain selected driving pulses) with an oscillating pulse from the piezoelectric device. The resulting vibration would cause tribo-charging and permit use of a reduced operating voltage. The piezoelectric vibration could alternatively be applied simultaneously with the driving pulse.

Piezoelectric materials could be used in a sheet form adjacent the display, or in the display module housing or otherwise in mechanical communication with the display, or incorporated into polymeric barrier ribs or the binder (the material used between capsules of an encapsulated display to form the separate capsules into a mechanically coherent layer) of the display such that all or only selected rows and columns could be shaken.

Ultrasonic vibrators are also well known in the art. An ultrasonic vibrator may be used to shake the entire display. Ultrasonic or acoustic waves could also enter the microcavities (capsules or microcells) of a display and directly move the electrophoretic particles.

Various techniques are available for conditioning the display of the present invention by sonic or acoustic waves. Such techniques may be categorized according to their frequency range. For example, mechanical vibrators may be operated in a range of about 60–120 Hz. Certain devices operate in the ultra high sonic frequency range, which is on the order of 800 KHz to 3 MHz. The use of such ultra high frequencies may be limited by the need to avoid overheating of the polymeric binders present in many displays. In a third approach, sonic waves are generated in the low ultrasonic frequency range, which is on the order of 500 Hz to 600 kHz, to perform oscillations with less likely to cause polymer degradation. The applied frequency may be matched to a resonant frequency of a gas-filled cavity, thereby achieving vigorous vibration.

In an more complex variation of this approach, the display is provided with liquid filled cavities in mechanical communication with the microcavities containing the gaseous suspending medium, and one of the above principles is used to cause the liquid-filled cavity to vibrate, causing motion of the gas-filled cavity.

Alternatively, the display could be physical shaken by the user. This may be appropriate or helpful in a low-cost, toy-like or third-world application of the present invention.

The motions described above may be in any plane or direction relative to the display. It is advantageous to select a frequency of motion that is matched to the electrophoretic particles for most efficient charging, and in some cases, it may be advantageous to vary the frequency or to sweep over a range of frequencies to effect charging of multiple types of electrophoretic particles.

The application of motion to the electrophoretic particles may be employed at various times. For example, motion may be employed prior to each rewriting of the display or only prior to selected rewrites, for example, only prior to rewrites which occur more than a predetermined period of time after the last application of motion. Mechanical tribo-charging may be used alone or in combination with electrical tribo-charging (see below), thereby reducing the voltage or duration needed for the electrical tribo-charging.

Micro-mechanical (MEMS) devices are well-known in the art with a variety of functions. Such devices (or an array of local micro-mechanical devices operating by the principles above or any suitable means) could be employed adjacent to the display to apply a local mechanical force to the walls of one or more microcavities containing the electrophoretic particles.

The forces described above may not only contribute to charging of the particles, but may also serve to knock stuck particles away from walls, thereby also reducing the operating voltage of the display.

Consideration will now be given to the movements of electrical charge within a GB display, and the effects of such charge movements. As already mentioned, tribo-charging requires mechanical agitation to provide the energy necessary for charge transfer, by collision among particles and/or between particles and some other entity that retains the charge transferred from the particle. This entity could be either a wall of a cavity in which the particles are confined or a second set of particles with a different charge affinity. If the charge-accepting entity is the wall, and if the wall is an insulator (as is believed to typically be the case), then the accumulation of a charge opposite to that on the particle will produce a substantial (attractive) force between the particle and the wall, and this force must be overcome by the externally applied field in order that switching can occur. If the charge-acceptor is a second particulate species (typically of a different color), then there will be a large attractive force between particles of opposite charge, and an appreciable amount of energy must be put into the system in order to separate these particles during switching. As long as the charges on the particles are maintained, then a field will be necessary to keep the particles in the switched state, no matter where the counter-charge resides, and the display will not be bistable. Since some GB displays are stated to be bistable, the foregoing considerations suggest that there are mechanisms (as there are in liquid phase displays) for eliminating the internal field produced by charge separation, and that these mechanisms are critical for the proper functioning of a GB display.

In displays using liquid suspending fluids, the internal fields can be dissipated, and the particle positions thus stabilized, by the motion of charges not associated with the particles themselves; such "free" charges may be present in various forms, for example charge-agent micelles, external phase ions, etc. In a GB display, how the internal fields are dissipated is not obvious, but possibilities include:

1. Dissipation of the particle charge by leakage back to a neutral state. If charge separation between unlike particles has occurred, as in an opposite charge dual-particle display, then the leakage has to occur between particles that are not in direct contact (since the display has been switched, the particles of the two types have been separated), either through the surrounding gas, or through leakage within the display walls; this requires some degree of charge mobility in the walls. The second mechanism seems more likely, and more likely to operate under a variety of conditions.
2. Dissipation of the charge into the wall, or formation of an image charge there that holds the particle in place. Like the first, this mechanism requires some degree of charge mobility in the walls.

In either case, it appears that charge transport through the walls of the display plays an important role in the proper functioning of a GB display, and hence such charge transport must be carefully regulated. The resistivity of the wall is critical. Experience with other types of electrophoretic displays suggests that the volume resistivity of the wall material should be of the order of $10^7$ to $10^{11}$ ohm cm (in accordance with the controlled resistivity wall display aspect of the present invention), and preferably towards the lower end of this range (say $10^7$ to $10^9$ ohm cm), since a GB display is capable of operation at higher speeds than liquid-based displays.

In any case, it appears inevitable that the charge separations produced by tribo-charging mechanisms in GB displays will decay with time. Since the charge on the particles is essential to their manipulation by an external electric field, the decay of that charge implies that the switching ability and visual characteristics of the display will similarly decay (over a period of the order of tens of seconds to hours) unless there is some mechanism for renewing the charge on the particles by mechanical agitation. As long as some charge remains, or if the applied field is high enough to result in appreciable breakdown (i.e., spontaneous charge generation), application of a field may result in the motion of those few particles with a remaining appreciable charge, with resulting collisions, and a cascading increase in charge on all particles. The efficiency with which this cascade results in charge generation will depend on the magnitude of the field in a highly non-linear manner; a voltage threshold may be expected, particularly if breakdown is a critical part of the charge generation process. Alternatively, using the dielectrophoretic tribo-charging method of the present invention) dielectrophoretic motion of the particles can also result in their motion, and this dielectrophoretic motion may be sufficient to initiate tribo-charging. Use of polarizable particles, or particles with polarizable cores, should enhance this dielectrophoretic motion, and may beneficially be employed in a GB display. It is not necessary for all the particles to have such polarizable characteristics; a small fraction of highly polarizable particles admixed with other less polarizable particles may be advantageous, since such a mixture would reduce the danger of particle chaining and consequent shorting of the electrodes, but the polarizable particles would be subjected to strong dielectrophoretic forces, and would move in the applied field gradient to initiate the tribo-charging cascade. In addition, the polarizability of certain particles should enhance attractive forces between the particles, and thus enhance the intimacy of contact between them that is necessary for effective tribo-charging.

Care should be taken in choosing the type of polarizable particles used. Metal particles are highly polarizable. However, in order to be useful in GB displays, metal or other highly conductive materials should be coated with a non-conductive shell, since otherwise chaining or agglomeration of the particles will occur, with probable shorting of the electrodes. Most metal particles are dark, so that they are difficult to use in white or light-colored particles. Semiconductive metallic oxide particles (such as indium oxide or indium tin oxide) are useful as polarizable particles. When the polarizable particle is of the core/shell type, the shell may comprise a organic polymer or co-polymer, or an inorganic ceramic material, or an insulating composite (mixed organic-inorganic) material. Useful polymeric materials include fluoropolymers, polyacrylates, polyesters, polyamides, and polyvinyl compounds, for example styrene, poly(vinyl acetate) or other polyvinyl esters.

The glass transition temperature of polymeric particles used in gas-based displays should be higher than the operating temperature of the display (say 80–100° C.) in order to prevent fusing of the particles on contact. Ceramic components of the shell may include silicates, aluminates, titanates, or any other metal oxide materials with a high melting point; these materials, by appropriate choice of precursor materials (especially metal alkoxides), may be incorporated into the shell by sol-gel methods, either alone, or in conjunction with organic components. The ease of charging and the sign of the charge acquired by tribo-charging will be controlled by the shell, so that shell composition should be primarily chosen to enhance the tribo-charging effect. This charging can also be enhanced by incorporation of small amounts of charge-control agents into the shell, for example cationic ammonium, sulfonium, and phosphonium and similar species. Dyes or, especially, colored pigment particles may also be incorporated into the shell to impart color to the particle, particularly when the core material is white or light-colored. When such core/shell particles are used in conjunction with a second, possibly similar core/shell type particle, and when the desired charging mechanism involves charge transfer between these particles, the polymer coatings should be chosen by reference to a suitable tribo-charging test. Such a test could involve making sheets or balls of two polymers, rubbing them together and measuring the nature of the charge-transfer between them (i.e., constructing a tribo-charging series, as is well-known in the tribo-charging literature). Materials with good mutual charging characteristics would be expected to be beneficial as components of the shell in a GB display.

A further way of enhancing tribo-charging is to incorporate into the display an additional type of particle (a carrier particle; such a carrier particle may be a second type of particle in the case of a single particle display, or a third type of particle in the case of a dual particle display), the role of this carrier particle being to enhance the charging of the other types of particles, either positively or negatively. The role of the carrier particle is analogous to that of the carrier particles typically used in xerographic applications. In such applications (see, for example, U.S. Pat. Nos. 3,590,000; 5,935,750; and 6,051,353), toner particles are required to have a surface charge so that they can be used for image development. The necessary charge is created by tribo-charging, the toner particles being physically admixed with carrier particles in a dry environment. Similarly, in the present invention, the additional type of particle (carrier particle) is added to the electrophoretic particles in a GB display to continually and efficiently regenerate the necessary charge on the electrophoretic particles. Thus, the presence of the carrier particles helps to maintain the performance of the GB display for longer periods of time, and allows it to re-charge faster when the display has been left for extended periods of time in the same state. The carrier particle generally should not itself be effective in producing a significant change in optical state, and for this purpose it is generally desirable that the carrier particle be of small size. Conceptually, the carrier particle may be regarded as having a role similar to that of the charging agent in a liquid-based electrophoretic display. The carrier particles can comprise ceramics, metals or combinations thereof. The carrier particles may also be coated with various polymeric coatings (cross-linked or not) to ensure that the charge created on the electrophoretic particles is of the desired polarity and magnitude. It is possible for a dual particle system to have a stable charge separation between particles, since the chemical potentials of the surfaces of the two types of particles will not generally be identical if they have different compositions. Thus, such a multi-particle system may enhance charging, or aid tribo-charging, or provide a means of stabilizing a switched optical state (by reducing or eliminating the internal field gradient without causing a migration of the electrophoretic particles). Indeed, in a dual particle system, the compositions, especially the surface compositions, of the two types of particles may be chosen so that each particle is in effect a carrier particle for the other.

Other considerations regarding materials for use in gas-based displays

When at least some of the particles used in a GB display are of the type having dyes or inorganic pigments embedded in a polymeric layer, it is, as stated above, desirable to use polymeric materials having glass transition temperatures above the maximum operating temperature of the display. If because of the type of dyes or pigments to be embedded, it is necessary to use polymeric matrix materials which soften at high temperatures, the particles may become tacky, thus causing the particles to agglomerate or "block". Any tendency to agglomeration or blocking may be reduced by cross-linking the polymer, thus reducing tack and the resultant blocking. Alternatively, small ceramic particles (for example, silica) which are much smaller (say 10 to 100 times smaller) than the electrophoretic particles themselves can be added to the polymer to act as anti-blocking agents and particle stabilizers.

Gas-based displays may be able to make use of a wider range of materials than liquid-based displays when a white or light-colored particle is desired. Because the liquids used as suspending fluids have refractive indices substantially greater than 1, liquid-based displays are constrained to use white pigments with very high refractive indices; among readily available pigments, titanium oxide (titania) is clearly the preferred choice. Either the anatase or rutile form of titania may be used, although the rutile form is generally preferred. However, the use of titanium oxide as a white (scattering) pigment is less critical in a GB display, since there is a much greater refractive index difference between the particles and the gas used (typically air) than there is between similar particles and a liquid suspending fluid. This greater difference may allow the use of a much wider variety of materials for a white pigment; even simple organic polymers may be sufficiently scattering to make an effective white pigment in a GB display.

Titania does have the problem that it has an ultra-violet activated band edge that can lead to free radical creation in the presence of oxygen or water, and the radicals thus produced can have a variety of undesirable effects in electrophoretic media. The paint industry has largely solved the problem of radical creation by coating titania with silica and/or alumina, and such coated forms of titania are available commercially. As described in several of the aforementioned E Ink and MIT patents and applications, such coated forms of titania are useful in liquid-based electrophoretic displays, and they are also useful in GB displays to enhance the stability of the electrophoretic particles used in such displays and prevent charging or discharging of the electrical charge present on the electrophoretic particles when the particles are exposed to radiation falling on the display.

Alternatively, the deleterious effects of ultra-violet radiation on titania or other particles sensitive to such radiation can be reduced or eliminated by applying an ultra-violet blocking film to any exposed surface of the display, and especially to the transparent substrate thereof. Such a blocking film can have the form of, for example, a laminated polymeric film or a sputtered coating.

A third possibility to reduce or eliminate the harmful effects of ultra-violet radiation on titania and other electrophoretic particles is to provide for "internal" absorption of ultra-violet radiation by including in the display at least one type of particle which absorbs such radiation. In particular, carbon black is known to absorb such radiation strongly, and is otherwise suitable for use as a black particle in a GB display. Thus, using carbon black as one of the types of particles in a GB display helps to protect other electrophoretic particles, and the display as a whole from the effects of ultra-violet radiation. The carbon black could be the only material in the electrophoretic particles, or the carbon black could be embedded in a larger polymeric particle cf. Donnet et al., "Carbon Black" (2d Edn.), Marcel Dekker, New York N.Y. (1993), pages 395–401.

Tribo-electric charging is also affected by the presence of moisture cf. the literature regarding the effect of water on charging of xerographic toners. Accordingly, in at least some cases, it may be desirable to include within a GB display a compound that acts as a water absorber (water getter), since the inclusion of such a water getter will increase the stability and reproducibility of charging of the electrophoretic particles. Appropriate water getters may be chosen from alkaline earth metals, and oxides, carbonates and sulfates thereof, or other strongly water absorbing compounds. Specific useful water getters include calcium, calcium carbonate, magnesium sulfate, sodium sulfate, calcium oxide and alumina. Since the presence of a loose particulate water getter within the display may be inconvenient for reasons mentioned above, it may be desirable to incorporate the water getter into a wall in contact with the gas. Specifically, when a GB display is of the microcell type, with the electrophoretic particles and gas confined within a plurality of closed cells, it may be advantageous to include water getters within the material used to form the cell walls.

For the same reason, it may be desirable to provide GB displays with water barrier coatings, for example in the form of sputtered ceramic coatings or polymeric films. If, as is typically the case, a GB display has an edge seal around its periphery, the properties of this edge seal are critical in controlling movement of moisture into or out of the display, and in practice the edge seal is often a larger source of water leakage into the display than the viewable surface of the display.

It has been stated above that one problem with GB displays is that the gas in such displays is not a medium with which the particles can be in electrochemical equilibrium, as is normally the case when the suspending fluid is liquid. While this statement is true when the gaseous suspending fluid is air or most of the gases (for example, nitrogen and argon) which it might be obvious to use as gaseous suspending fluids, the ionization potential of the gas phase can be manipulated by the choice of gases used, and this ionization potential can affect triboelectric charging. For example, mixtures of gases are commonly used in high energy physics drift chambers to tailor the ionization voltage, which particles it interacts with, etc. Magic gas (75 percent argon, 24 percent isobutene and 0.5 percent Freon (bromotrifluoromethane)) is the most popular gas for this purpose. Other gases, for example argon and carbon dioxide, donate electrons more easily at low voltage, methane and ethane interact more strongly with photons, while ethanol avoids deposits. Thus, it is possible to use gases that can accept electrons from, or donate electrons to, the electrophoretic particles in order to increase charging of the particles. Other examples of such electron donor/acceptor gases include monovalent species used in fluorescent lamps (for example, sodium and mercury) and gases with high electron affinities, such as the halogens, especially chlorine.

Color Gas-Based Displays

Consideration will now be given to methods for providing color GB displays. Color GB displays can be made by several of the methods previously described for liquid-based displays, as discussed in several of the aforementioned E Ink and MIT patents and applications. These methods include color filter arrays (CFA's), in-plane switching (using a lateral movement display of the present invention), and patterned deposition of pixels or sub-pixels with appropriate colored pigments.

Any black-and-white display sufficiently reflective in the white state can be used to make a color display by superimposing an array of color filters in register with appropriately switchable pixels. The CFA can be made from either additive (RGB) or subtractive (CMY) primary colors; each has its own set of advantages and disadvantages.

Lateral movement displays can be used to provide a color display in several ways. Typically, electrophoretic particles can be switched between a state that covers the aperture of a pixel and another that renders the aperture transparent. If a colored reflector is placed behind the pixel, the pixel will display the color of the reflector in the open (transparent) state, and display the color of the electrophoretic particles (typically either white or black) in the closed (scattering) state. It is possible to use both white and black particles (a dual particle display), and by appropriate switching, to obtain either white, black or a given color (that of the reflector). Typically, this approach requires multiple, separately addressable electrodes in the pixel. To reach the open state, the side walls of the pixel cell can be activated (for a dual particle system, opposite walls can be addressed to different potentials). To close the pixel, the front or back of the pixel, or both front and back, are activated. If both front and back are addressable, then the sign of charge at the front electrode will determine which particles will move there, and this choice then determines what color will be displayed. The particles can be either black and white, and the background colored, or one of the pigments can be colored and the other either black or white and the background reflective or absorbing respectively.

Figure 1:
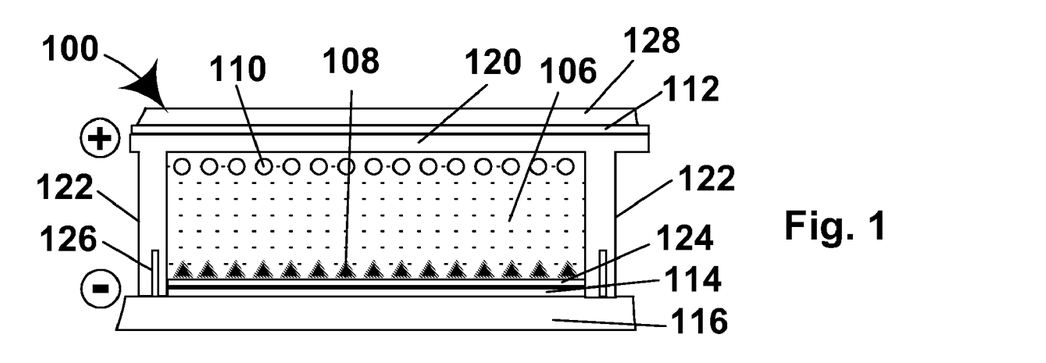
FIGS. 1, 2 and 3 of the accompanying drawings are schematic sections through a lateral movement display of the present invention, showing the positions of the electrophoretic particles in three different optical states of the display.
Figure 2:
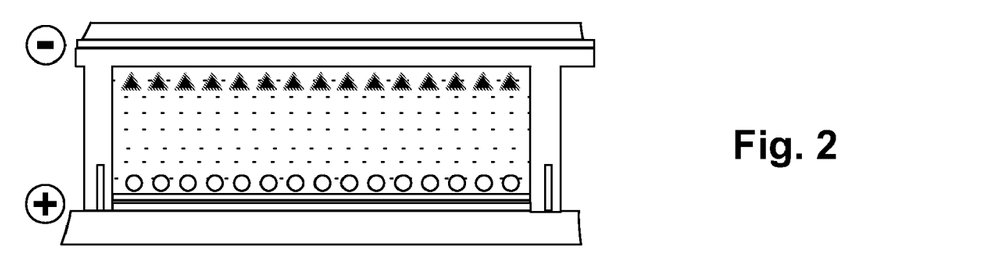
Figure 3:
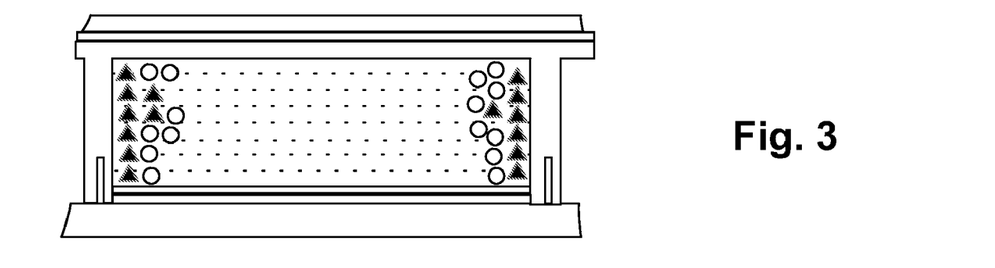

One cell of a dual particle lateral movement display (generally designated 100) of this type is shown in FIGS. 1 to 3 of the accompanying drawings. The display 100 is of the microcell type and uses an electrophoretic medium comprising a gas 106 containing black particles 108 capable of being tribo-electrically charged to a positive polarity and white particles 110 capable of being tribo-electrically charged to a negative polarity. (The triangular shapes of the particles 108 and the spherical shapes of the particles 110 are used to enable the particles to be readily distinguished in the drawings and are not intended to indicate the actual shapes of the particles, which may have a variety of shapes depending upon the specific material employed.) The display 100 further comprises a rear substrate 116 carrying a pixel electrode 114 covered by a colored dielectric layer 124, a transparent front substrate 120 provided with a continuous transparent front electrode 112 (which lies on the opposed side of the front substrate 112 from the electrophoretic medium itself) and a transparent front protective sheet 128, which provides mechanical protection to the front electrode 112. Side walls 122 extend between the front and rear substrates 120 and 116 and define the microcells within which the gas 106 and the particles 108 and 110 are confined.

For ease of illustration, FIGS. 1 to 3 show the display 100 as if the illustrated microcell comprises one pixel of the display. In practice, a single pixel usually extends across several microcells, so that the pixel electrode 114 and its associated coating 124 also extend across several pixels, but this makes no essential difference to the manner in which the device operates.

The display 100 has three main optical states. In FIG. 1, the pixel electrode 114 is made negative with respect to the front electrode 112 (as indicated by the + and − signs at the left-hand side of FIG. 1), so that the negatively charged white particles 110 lie adjacent the front electrode 112, the black particles 108 lie adjacent the pixel electrode 114 and the pixel appears white to an observer viewing the display through the protective sheet 128 (i.e., from above in FIGS. 1 to 3).

In FIG. 2, the pixel electrode 114 is made positive with respect to the front electrode 112, so that the negatively charged white particles 110 lie adjacent the pixel electrode 114, the black particles 108 lie adjacent the front electrode 112 and the pixel appears black to an observer viewing the display.

In FIG. 3, an alternating voltage has been applied between the electrode 112 and 114 causing both types of particles 108 and 110 to move laterally under dielectrophoretic forces and lie adjacent the side walls 122, so that the observer viewing the display sees the color of the coating 124. Obviously, the coating 124 and the pixel electrode 114 could be made transparent and the rear substrate 116 could be formed as colored reflector or filter, or the rear substrate could also be made transparent and a separate colored reflector or filter provided adjacent the rear substrate.

The operation of the display shown in FIGS. 1 to 3 requires that both types of particles 108 and 110 be susceptible to movement by dielectrophoretic forces. If the particles are not so susceptible, auxiliary electrodes 126 may be provided in the side walls 122. If one auxiliary electrode is made negative and the other positive relative to the front electrode 112, the white particles 110 will be attracted to the positive auxiliary electrode, and the black particles 108 to the negative auxiliary electrode, so that again all the particles will lie adjacent the side walls of the display 100 and the color of the coating 124 will be visible to the observer.

The colored particles used in color GB displays of the present invention can be made by using a colored core pigment covered with a tribo-charging polymer/composite shell, or by using a white pigment with a shell that is dyed or that comprises smaller colored pigments. The second approach is generally preferred because of the higher tinctorial strength of pigment particles.

Driving of Gas-Based Displays

More systematic consideration will now be given to methods for reducing the operating voltage of GB displays. Many of the mechanistic considerations discussed in the introductory part of this application suggest that there will be a substantial voltage threshold for operation of a GB display. A threshold results from a barrier of some kind, either to the separation of charge, or to its formation. Several ways in which such a threshold may arise have been discussed above. Ways of reducing the threshold, and thereby allowing operation at lower voltages, depend on the mechanism giving rise to the threshold. Some possibilities include the following.

Decay of the particle charge means that there may be little charge on the particles at the beginning of a driving pulse, so that high voltages may be required to initiate charging (by breakdown, for example, or by dielectrophoretic or induced-polarization aggregation, or other mechanisms, as discussed above). Clearly, any means of improving the ease with which charge generation occurs will reduce the operating voltage necessary to overcome this type of threshold, and some appropriate means are mentioned above.

In a single particle system, tribo-charging apparently involves charge transfer to a wall, there being no obvious alternative. In this case, as discussed above, if the image is to remain stable for a substantial period after the driving voltage is removed, then the charge in the wall must migrate so as to stabilize the position of the particles in the switched state. Thus, there must be, at least transiently, an image charge adjacent to the particle. Migration of the charge in the wall requires a certain relatively low conductivity, probably of the order of $10^7$ to $10^{11}$ ohm cm volume resistivity. If the particle is immediately switched again, then a substantial voltage must be applied to separate the particle from the oppositely charged wall; the magnitude of this separating voltage will vary with time as the charge on the electrophoretic particle decays, so that the optical behavior of the display may vary with the "dwell time" for which a given pixel remains in one optical state, i.e., the display may exhibit dwell-state dependent image artifacts. For a given particle charge, smaller particles will have a larger attractive force, so that use of larger particles should allow a smaller operating voltage. For similar reasons, mixtures of small and large particles (or a polydisperse mixture of particle sizes) may assist in generating gray scale, since the larger particles may migrate before the smaller ones. Similar considerations apply to a dual particle system, for both particles. Generally, smaller particles should be harder to switch than larger, and it may be advantageous to use controlled mixtures of sizes. The range of particle sizes should generally be at least about 2:1, and preferably about 5:1 to ensure a good gray scale. Larger size ranges can of course be used.

Reducing the distance between the electrodes increases the electric field applied to the electrophoretic particles, and hence reduces the applied voltage necessary to achieve switching for a given set of particles. However, the effect of reducing electrode spacing is smaller in GB displays than in liquid-based ones, since in the latter the viscosity of the liquid medium means that the transit time of the particles through the liquid suspending fluid affects the switching time, so that, for a liquid-based display, the voltage dependence is on the square of the electrode spacing, whereas in a GB display, the required voltage should vary approximately linearly with the electrode spacing.

5. "Diluent" particles may also be used to lower operating voltage, as already mentioned. Diluent particles (which should be sharply distinguished from the carrier particles discussed above) are particles of the same color as the "primary" electrophoretic particle, but have an opposite, though smaller, charge. The diluent particles can act as spacers, and diminish the force of attraction between the primary particle and the wall. The diluent particle should also be smaller in size than the primary particle; if the diluent particles were sufficiently small they could possibly be of the same charge as the primary particle. Their small size would balance the effect of their smaller charge, so that they would preferentially be interposed between the primary particles and the wall surface.

The variable charging of the electrophoretic particles in GB displays has important implications for the manner in which such displays are driven. Firstly, consider methods for achieving a well defined charge on the electrophoretic particles during driving of the display. In one such method, one or more high-voltage pre-pulses (i.e., preliminary pulses preceding and having a higher voltage than the main driving pulse) are applied prior to a driving pulse. The function of the driving pulse is of course to effect an optical transition from an initial to a final optical state of a pixel. The function of the high voltage pre-pulses is to achieve a well defined voltage on the electrophoretic particles within the display. The pre-pulses are preferably voltage pulses with magnitudes significantly greater than the driving voltage (i.e., the voltage of the driving pulse) but with short durations, preferably (a) shorter than about 20 milliseconds, or (b) shorter than a voltage pulse of the same magnitude which would be required to achieve a transition between two extreme optical states of the electrophoretic medium. Either of these conditions satisfies the desideratum that the pre-pulses not create large changes in optical state that are readily observable.

Such pre-pulses may have various forms. For example, there may be a single pre-pulse, a pair of pre-pulses of opposite polarity (desirably such that the net impulse of the pair of pulses is zero or substantially zero), or a train of pre-pulses of alternating polarities. Such a train of pulses may comprise a series of pulses of the same duration but alternating polarity, or the duration of the pre-pulses may vary from pulse to pulse. There may be gaps (i.e., periods of zero or essentially zero voltage) between the pre-pulses.

Appropriate arrangements of pre-pulses can impose electrophoretic particle charging that is sufficiently stabilized to a predictable value to enable pre-defined waveforms to reliably achieve desired optical transitions. In practice, the pre-pulses may be applied either periodically to ensure predictable particle charging or prior to some or all optical transitions.

Low impulse pre-pulses of moderate or low voltage can also be used to achieve predictable charging of the electrophoretic particles. The voltages used in such low impulse pre-pulses are similar to or lower than those used in the drive pulses. Again, the pre-pulses may comprise single pulses, pairs of pulses or trains of pulses. Low impulse pre-pulses need not be of short duration. Such low impulse pre-pulses should have a limited effect on the optical state of the relevant pixel, and should not induce large changes in its optical state. Desirably, low impulse pre-pulses do not change the optical state of the pixel by more than about 20 percent of the reflectance change between the two extreme optical states of the electrophoretic medium (typically black and white optical states). Appropriate arrangements of low impulse pre-pulses can impose electrophoretic particle charging that is sufficiently stabilized to a predictable value to enable pre-defined waveforms to reliably achieve desired optical transitions.

Despite all the foregoing measures and techniques, it remains likely that variation in the charge on the electrophoretic particles in GB displays, and in particular the tendency for this charge to diminish when a pixel of a GB display remains in the same optical state for an extended period, will remain significant problems. In other words, GB displays are likely to suffer from "dwell time dependency" a phenomenon known in some liquid-based electrophoretic displays whereby the response of the pixel to a given driving pulse or series of pulses varies with the period for which the pixel has previously remained in the same optical state. However, for reasons discussed above, the dwell time dependency problem is likely to be substantially more severe in GB displays than in liquid-based ones, since charges on the electrophoretic particles are more less stable in the former.

A number of techniques for minimizing dwell time dependency (or the broader problem known as "remnant voltage") have been developed for use in liquid-based displays, and such techniques may be used with equal or greater advantage in GB displays. See, for example, the aforementioned 2003/0137521; 2005/0001812; 2005/0024353; 2005/0179642; 2005/0212747; 2005/0280626; and application Ser. No. 11/162,188, filed Aug. 31, 2005 (Publication No. 2006/0038772).

Some of the published and copending applications mentioned in the preceding paragraph also discuss methods for adjusting display driving techniques to allow for the effect of temperature and humidity changes and the same techniques may be used to compensate for temperature and humidity changes in GB displays, although the variations in optical states of GB displays caused by temperature and humidity changes may not be identical to those caused in liquid-based displays since, for example, the viscosity of liquid suspending fluids decreases with increasing temperature whereas the viscosity of gaseous suspending fluids increases with increasing temperature.

Coated Electrode in Gas-Based Displays

Further aspects of the present invention relate to providing coatings over the electrodes in GB displays. Although the prior art on GB displays does contain a limited discussion of such coatings, it does not discuss all the numerous ways in which such coatings may be used to improve the performance of GB displays. In fact, careful choice of microscopic features in a GB display can offer several advantages. Consider an insulating layer between one of the electrodes and a gaseous suspending fluid. The thickness and dielectric constant of the insulator affect van der Waals and image charge attractive forces acting on the electrophoretic particle. If the display is of the conventional type with a common front electrode on one side of the electrophoretic medium, and a matrix of pixel electrodes on the opposed side, and if various regions of a pixel electrode or front electrode have various thicknesses of insulating coating thereon, a position-dependent attraction can be induced between the electrophoretic particles and the front and back surfaces of the display, and thus a spatially-dependent threshold voltage holding electrophoretic particles against the walls of the display. Such a spatially-dependent threshold voltage can be used to achieve grayscale addressing. A voltage that exceeds a threshold voltage for some regions of a pixel but not for others will cause electrophoretic particle movement of the former regions but not of the latter. A voltage that exceeds the threshold voltage across the entire pixel electrode will achieve full switching of the pixel. In this way, one can achieve not only black and white extreme optical states, but also intermediate gray levels.

Furthermore, a very finely patterned dielectric film over the electrodes can impart threshold behavior that depends upon the pattern such as the fractional coverage of the electrode by the dielectric film. By varying the pattern across a pixel electrode, one can induce spatially varying switching behavior; for example, by varying the local fractional coverage of the electrode by a polymeric coating, one can induce a spatially-varying voltage threshold.

Such fine patterns can be created in various ways. For example, a photoresist coating may be deposited and patterned using techniques traditionally used in the semiconductor industry. Alternatively, a layer of material may be deposited and stamped with a stamp bearing the desired pattern or its inverse. An etching step may be included in the patterning process. One specific method for patterning a thin film is to coat the thin film with a thin layer of gold, then stamp the film with a rubber stamp bearing the desired image, the stamp being coated with an alkane thiol. The alkane thiol acts as a chemical resist during subsequent etching. Finally, the gold layer is removed. Other methods involve photo-definition by cross-linking through a mask, for instance, or applying an etch resist using a non-rubber mask.

Coatings on the electrodes of GB displays are not, however, confined to insulating coatings. The electrical properties of a coating interposed between electrodes and the gaseous suspending fluid can play an important role in switching properties. A coating may comprise, for example, a polymeric binder filled with conductive particles, for example conductive needles, flakes, or spheroids. Across a narrow range of conductive particle concentrations, the polymeric binder exhibits threshold-like behavior; that is to say it is insulating for small electric fields but conductive for large electric fields. Such materials are routinely made for manufacturing anti-static bags and housings for electrical devices. Their incorporation into GB displays as electrode coatings can induce threshold behavior related to the voltage required to achieve conduction across the electrophoretic medium. With a sufficiently thin coating, practical switching voltages can induce electric fields across the polymeric film sufficient to exceed the threshold voltage. This can aid in electrophoretic particle movement in two ways: (a) it can provide a pathway for particle charging from charges injected from the electrode; and (b) above the threshold voltage, the voltage drop across the display is concentrated in the gaseous suspending fluid. In both these ways, coatings similar to those used in anti-static materials and packages can be used to provide threshold behavior in GB displays, and the threshold voltage can be adjusted by modifying the coating thickness. Such coatings can also be advantageous because they can block charge on the electrophoretic particles from transferring to the electrodes.

As already indicated, in GB displays coatings over the electrodes can serve several purposes. Such coatings can block charge transfer between the electrophoretic particles and the electrodes, and can reduce electrostatic attraction between the charged electrophoretic particles and the electrodes due to image charge attraction. This reduction in attraction increases with increasing coating thickness. Also, a coating over the electrode will change the van der Waals attraction of the electrophoretic particles to the solid surface of the cavity in which the electrophoretic particles are confined. Examples of useful coatings include vacuum evaporated films such as silicon dioxide and polymer films that are deposited by spin coating, bar coating, as well as other means, and molecular monolayers such as alkane thiols deposited by dip coating from solution.

Numerous changes and modifications can be made in the preferred embodiments of the present invention already described without departing from the scope of the invention. Accordingly, the whole of the foregoing description is to be construed in an illustrative and not in a limitative sense.

What is claimed is:

1. An electrophoretic display comprising a pair of facing substrates at least one of which is transparent, a plurality of particles and a gas enclosed between the substrates, and means for applying an electric field across the substrates so as to cause the particles to move between the substrates, the display further comprising a water-absorbing compound in contact with the gas.

2. An electrophoretic display according to claim 1 wherein the water-absorbing compound comprises at least one of an alkaline earth metal and an oxide, carbonate or sulfate of an alkaline earth metal.

3. An electrophoretic display according to claim 1 wherein the water-absorbing compound comprises at least one of calcium carbonate, magnesium sulfate, sodium sulfate, calcium oxide and alumina.

4. An electrophoretic display according to claim 1 wherein the water-absorbing compound is incorporated into a wall in contact with the gas.

5. An electrophoretic display according to claim 4 wherein the display comprises a plurality of cell walls extending between the two substrates and defining a plurality of cavities within which the gas and the particles are confined, and wherein the water-absorbing compound is incorporated into the cell walls.

6. An electrophoretic display comprising a pair of facing substrates at least one of which is transparent, a plurality of at least one type of particle and a gas enclosed between the substrates, means for applying an electric field across the substrates so as to cause the particles to move between the substrates, and vibration inducing means for causing mechanical vibration and tribo-charging of the at least one type of particle.

7. An electrophoretic display comprising a pair of facing substrates at least one of which is transparent, a plurality of at least one type of particle and a gas enclosed between the substrates, and means for applying an electric field across the substrates so as to cause the particles to move between the substrates, the display having at least one wall in contact with the gas and having a volume resistivity in the range of about $10^7$ to about $10^{11}$ ohm cm.

8. A method of charging particles in an electrophoretic display, the display comprising a pair of facing substrates at least one of which is transparent, a plurality of a first type of particle capable of being triboelectrically charged, a plurality of a second type of particle having a polarizability greater than that of the first type of particle, and a gas, the first and second types of particles and the gas being enclosed between the substrates, the method comprising applying a non-uniform electric field between the substrates, thereby causing dielectrophoretic movement of the second type of particles and consequent triboelectric charging of the first type of particles.

9. An electrophoretic display comprising a pair of facing substrates at least one of which is transparent, a plurality of a first type of particle and a gas enclosed between the substrates, and means for applying an electric field across the substrates so as to cause the first type of particles to move between the substrates, the display further comprising a plurality of a second type of particle effective to increase triboelectric charging of the first type of particles.

10. An electrophoretic display comprising a pair of facing substrates at least one of which is transparent, a plurality of particles and a gas enclosed between the substrates, and means for applying an electric field across the substrates so as to cause the particles to move between the substrates, wherein the particles comprise titania coated with silica and/or alumina.

11. An electrophoretic display comprising a pair of facing substrates at least one of which is transparent, a plurality of particles and a gas enclosed between the substrates, and means for applying an electric field across the substrates so as to cause the particles to move between the substrates, wherein the particles comprise carbon black having a polymeric coating.

12. An electrophoretic display comprising a pair of facing substrates at least one of which is transparent, a plurality of particles and a gas enclosed between the substrates, and means for applying an electric field across the substrates so as to cause the particles to move between the substrates, wherein the transparent substrate is provided with a coating for reducing the transmission of ultraviolet radiation through the transparent substrate.

13. An electrophoretic display comprising a pair of facing substrates at least one of which is transparent, a plurality of particles and a gas enclosed between the substrates, and means for applying an electric field across the substrates so as to cause the particles to move between the substrates, wherein at least some of the particles are arranged to absorb ultraviolet radiation.

14. An electrophoretic display comprising a pair of facing substrates at least one of which is transparent, a plurality of particles and a gas enclosed between the substrates, and means for applying an electric field across the substrates so as to cause the particles to move between the substrates, wherein the gas is able to accept electrons from, or donate electrons to, the particles.

15. An electrophoretic display comprising a pair of facing substrates at least one of which is transparent and forms a viewing surface, cell walls defining a plurality of cavities between the substrates, a plurality of particles and a gas enclosed within the cavities, and means for applying an electric field across the substrates so as to cause the particles to move between the substrates, the means for applying an electric field being arranged to drive the particles to a first optical state, in which at least some of the particles lie adjacent the viewing surface so that the viewing surface displays a first optical characteristic, and to drive the particles to a second optical state, in which the particles are disposed adjacent the cell walls so that the light can pass through the cavities and the viewing surface displays a second optical characteristic different from the first optical characteristic.

16. An electrophoretic display according to claim 15 wherein the means for applying electric field is arranged to apply a non-uniform electric field so that the particles are moved by dielectrophoretic forces to the cell walls.

17. An electrophoretic display according to claim 15 wherein the means for applying electric field comprises electrodes disposed at or adjacent the cell walls for moving the particles adjacent the cell walls.

18. An electrophoretic display according to claim 15 wherein the particles include a plurality of a first type of particle capable of being charged with a charge of a first polarity and having the first optical characteristic, and a plurality of a second type of particle capable of being charged with a charge of a second polarity opposite to the first polarity, the second type of particle having a third optical characteristic different from the first and second optical characteristics.

19. An electrophoretic display comprising a pair of facing substrates at least one of which is transparent, a plurality of particles and a gas enclosed between the substrates, and means for applying an electric field across the substrates so as to cause the particles to move between the substrates, the particles comprising a plurality of a first type of particle capable of being charged with a charge of a first polarity, and a plurality of a second type of particle capable of being charged with a charge of a second polarity opposite to the first polarity, the charge on the second type of particle being smaller in magnitude than the charge on the first type of particle, the first and second types of particles having substantially the same optical characteristic.

20. An electrophoretic display comprising a pair of facing substrates at least one of which is transparent, a plurality of particles and a gas enclosed between the substrates, and means for applying an electric field across the substrates so as to cause the particles to move between the substrates, the display comprising a plurality of pixels and the means for applying an electric field comprising at least one electrode having a surface covered by an insulating coating, the thickness of the insulating coating varying within one pixel.

21. An electrophoretic display according to claim 20 wherein the insulating coating is patterned so that some parts of the electrode are free of the insulating coating.

22. An electrophoretic display according to claim 20 wherein the whole of the area of the electrode corresponding to the one pixel is covered by the insulating coating, but the thickness of the insulating coating varies from point to point within the pixel.

23. An electrophoretic display comprising a pair of facing substrates at least one of which is transparent, a plurality of particles and a gas enclosed between the substrates, and means for applying an electric field across the substrates so as to cause the particles to move between the substrates, the display comprising at least one electrode having a surface covered by an coating which is insulating at low electric fields but conductive at high electric fields.

24. An electrophoretic display comprising a pair of facing substrates at least one of which is transparent, a plurality of particles and a gas enclosed between the substrates, and means for applying an electric field across the substrates so as to cause the particles to move between the substrates, wherein the particles comprise a polymer having a glass transition temperature of at least about 80° C.

25. An electrophoretic display comprising a pair of facing substrates at least one of which is transparent, a plurality of particles and a gas enclosed between the substrates, and means for applying an electric field across the substrates so as to cause the particles to move between the substrates, wherein the plurality of particles comprises particles having substantially the same optical characteristics but differing in size by a factor of at least about 2.

26. An electrophoretic display according to claim 25 wherein the plurality of particles comprises a plurality of a first type of particle having a first optical characteristic and capable of being triboelectrically charged with a charge of a first polarity, and a plurality of a second type of particles having a second optical characteristic different from the first optical characteristic and capable of being triboelectrically charged with a charge of a second polarity opposite to that of the first polarity, wherein both the first and second types of particles comprise particles having substantially the same optical characteristics but differing in size by a factor of at least about 2.

27. An electrophoric display according to claim 6 wherein the vibration inducing means comprises a piezoelectric device.

28. An electrophoretic display according to claim 27 wherein the piezoelectric device is present in sheet form.

29. An electrophoretic display according to claim 6 wherein the vibration inducing means comprises a generator of sonic or ultrasonic waves.

30. An electrophoretic display according to claim 29 wherein the sonic or ultrasonic waves have a frequency in the range of about 500 Hz to about 600 kHz.

31. An electrophoretic display according to claim 6 wherein the vibration inducing means comprises walls defining cavities, a liquid present in the cavities in mechanical communication with the gas, and means for causing vibration of the liquid and thereby inducing vibration in the gas.

32. An electrophoretic display according to claim 6 wherein the vibration inducing means is arranged to vary the frequency of the mechanical vibrations of the particles.

33. An electrophoretic display according to claim 6 wherein the vibration inducing means is arranged to apply mechanical vibration to the particles prior to each rewriting of the display.

34. An electrophoretic display according to claim 6 wherein the vibration inducing means is arranged to apply mechanical vibration to the particles prior to each rewriting of the display which occurs more than a predetermined period after the last application of mechanical vibration.

35. An electrophoretic display according to claim 6 wherein the vibration inducing means comprises at least one micro-mechanical device.

36. An electrophoretic display according to claim 6 wherein the gas and the particles are confined within a plurality of cavities formed in a carrier medium.

37. An electrophoretic display according to claim 7 wherein the wall has a volume resistivity in the range of about $10^7$ to about $10^9$ ohm cm.

38. An electrophoretic display according to claim 7 wherein the gas and the particles are confined within a plurality of cavities formed in a carrier medium, the cavities being separated from one another by walls having a volume resistivity in the range of about $10^7$ to about $10^{11}$ ohm cm.

39. A method according to claim 8 wherein the second type of particles comprises an electrically conductive core surrounded by a substantially non-conductive shell.

40. A method according to claim 39 wherein the core comprises a metal.

41. A method according to claim 8 wherein the second type of particles comprises a semi-conductive metal oxide.

42. A method according to claim 41 wherein the semi-conductive metal oxide comprises indium oxide or indium tin oxide.

43. A method according to claim 39 wherein the shell comprises a material selected from organic polymers and copolymers, inorganic ceramic materials, and insulating organic/inorganic composites.

44. A method according to claim 43 wherein the organic polymer or copolymer is selected from fluoropolymers, polyacrylates, polyesters, polyamides and polyvinyl compounds.

45. A method according to claim 39 wherein the shell comprises a charge control agent.

46. A method according to claim 45 wherein the charge control agent comprises an ammonium, sulfonium or phosphonium salt.

47. An electrophoretic display according to claim 9 further comprising a plurality of a third type of particle, the third type of particle developing a charge, upon triboelectric charging, of opposite polarity to that of the first type of particle, the third type of particle also having at least one optical characteristic different from that of the first type of particle.

48. An electrophoretic display according to claim 9 wherein the second type of particle is smaller than the first type of particle.

49. An electrophoretic display according to claim 9 wherein the second type of particle comprises a metal or a ceramic.

50. An electrophoretic display according to claim 49 wherein the second type of particle is coated with a polymer.

51. An electrophoretic display according to claim 12 wherein the coating comprises a polymeric film or sputtered coating.

52. An electrophoretic display according to claim 13 wherein the particles arranged to absorb ultraviolet radiation comprise carbon black.

53. An electrophoretic display according to claim 52 wherein the plurality of particles further comprise titania particles.

54. An electrophoretic display according to claim 14 wherein the gas comprises an alkali metal, mercury or a halogen.

55. An electrophoretic display according to claim 54 wherein the gas comprises sodium, mercury or chlorine.

56. An electrophoretic display according to claim 18 wherein the first and second types of particles are white and black.

57. An electrophoretic display according to claim 18 wherein one of the first and second types of particles has a color other than white or black.

58. An electrophoretic display according to claim 18 further comprising a colored reflector or filter disposed on the opposed sides of the cavities from the viewing surface.

59. An electrophoretic display according to claim 58 wherein the colored reflector or filter comprises areas having at least three different colors.

60. An electrophoretic display according to claim 19 wherein the second type of particle is smaller than the first type of particle.

61. An electrophoretic display according to claim 23 wherein the coating comprises an insulating binder filled with non-spherical conductive particles.

62. An electrophoretic display according to claim 24 wherein the polymer has a glass transition temperature of at least about 100° C.

63. An electrophoretic display according to claim 24 wherein the polymer comprises any one or more of a-fluoropolymer, polyacrylate, polyester, polyamide and polyvinyl compound.

64. An electrophoretic display according to claim 25 wherein the plurality of particles comprise particles having substantially the same optical characteristics but differing in size by a factor of at least about 5.

* * * * *